(12) United States Patent
Fries

(10) Patent No.: US 9,403,308 B2
(45) Date of Patent: Aug. 2, 2016

(54) MOLDING TOOL FOR PRODUCING A COMPONENT IN A GAS-ASSISTED INJECTION MOLDING PROCESS

(71) Applicant: ILLINOIS TOOL WORKS INC., Glenview, IL (US)

(72) Inventor: Elmar Fries, Roettingen (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 14/653,865

(22) PCT Filed: Dec. 10, 2013

(86) PCT No.: PCT/US2013/073986
§ 371 (c)(1),
(2) Date: Jun. 19, 2015

(87) PCT Pub. No.: WO2014/099456
PCT Pub. Date: Jun. 26, 2014

(65) Prior Publication Data
US 2015/0328813 A1 Nov. 19, 2015

(30) Foreign Application Priority Data

Dec. 21, 2012 (DE) .......................... 10 2012 025 117

(51) Int. Cl.
*B29C 45/16* (2006.01)
*B29C 45/18* (2006.01)
*B29C 45/17* (2006.01)
*B29C 45/27* (2006.01)

(52) U.S. Cl.
CPC ............. *B29C 45/18* (2013.01); *B29C 45/1734* (2013.01); *B29C 45/1603* (2013.01); *B29C 45/2725* (2013.01); *B29C 2045/1729* (2013.01); *B29C 2045/1737* (2013.01)

(58) Field of Classification Search
CPC ..................... B29C 45/1603; B29C 45/2725
USPC ........................................ 425/130; 264/572
See application file for complete search history.

(56) References Cited

U.S. PATENT DOCUMENTS 4,781,554 A * 11/1988 Hendry ............... B29C 45/1732
425/130
5,282,730 A * 2/1994 Daniels ................. B29C 45/401
264/572
2002/0148511 A1 10/2002 McKaig

FOREIGN PATENT DOCUMENTS

| EP | 1256433 A1 | 11/2002 |
| JP | H05200794 A | 8/1993 |
| JP | H0691686 A | 4/1994 |
| JP | H07256683 A | 10/1995 |

OTHER PUBLICATIONS

Brunswick, A., "Gewusst Wie! Fragen Und Antworten Zur Wasserinjektionstechnik," Kunstoffe, Carl Hanser Verlag, Munich, DE, vol. 92, No. 9, Sep. 1, 2002, pp. 94-98 with English abstract.
ISR and WO for PCT/US2013/073986 mailed Feb. 5, 2014.

* cited by examiner

*Primary Examiner* — Tim Heitbrink
(74) *Attorney, Agent, or Firm* — Hauptman Ham, LLP

(57) ABSTRACT

A molding tool for producing a component in a gas-assisted injection molding process includes a mold cavity, and an injection device with a pressurized gas source. The pressurized gas is fed into the plastic melt introduced into the mold cavity. The plastic melt is pressed against the inner walls of the mold cavity. The injection device has a piston with an injector head and moveably guided in a passage of a molding tool connected with the mold cavity. The injector head forms a part of the inner walls of the mold cavity in an idle position of the piston, and is pressed into the plastic melt as the piston moves to its operating position, so that the pressurized gas flows through the passage into the plastic melt in the mold cavity. The piston is moveable by the gas fed through the passage into the plastic melt.

18 Claims, 1 Drawing Sheet

MOLDING TOOL FOR PRODUCING A COMPONENT IN A GAS-ASSISTED INJECTION MOLDING PROCESS

RELATED APPLICATIONS

The present application is a National Phase of International Application Number PCT/US2013/073986 filed Dec. 10, 2013 and claims priority to German Application Number 10 2012 025 117.3 filed Dec. 21, 2012.

BACKGROUND

The invention relates to a molding tool for producing a component in a gas-assisted injection molding process, comprising a mold cavity, the inner walls of which reproduce the contour of the component which is to be produced, a molding device, with which plastic melt can be introduced into the mold cavity, and an injection device with a pressure gas source, with which gas under pressure can be fed into the plastic melt which is introduced into the mold cavity, wherein the plastic melt is pressed against the inner walls of the mold cavity.

SUMMARY OF THE INVENTION

In gas-assisted injection molding processes, a plasticated plastic melt is first of all injected into a mold cavity of the molding tool. Gas under high pressure is then directed into the plastic melt by means of an injection device, wherein the gas forms a gas bubble in the plastic melt and the plastic melt is pressed against the walls of the mold cavity and possibly into branching regions of the mold cavity. By means of such methods, surfaces of particularly high quality are created. At the same time, savings in material and weight are possible.

Before opening the molding tool for extracting the produced component, the high pressure which is produced for injecting the gas has to be relieved again so that damage when removing the component from the mold is prevented. Injection devices, which are designed as an annular gap or as a hydraulic injector for pressure build up and pressure relief, are known.

An annular-gap injection device has an annular gap with a very small gap width of 0.01 mm, for example. Gas for the gas-assisted injection molding process is introduced through this very thin annular gap and then released again. The annular gap is of such small size that in the course of the injection molding process plastic melt which is injected into the mold cavity cannot enter the annular gap. Over-injecting is therefore prevented. Furthermore, such annular-gap injectors are distinguished by low investment costs, simple operation and quick cleaning. It is disadvantageous on the one hand that a high degree of contamination, and therefore an appreciable cleaning cost, comes about. Furthermore, the gas pressure is built up in a comparatively undefined manner and a slow pressure relief takes place. On account of the introduction through the annular gap, a reproducible opening of the plastic melt is not carried out either at any time. A self-cleaning effect is not achieved either.

In the case of a hydraulic injector, a hydraulically actuated cylinder drives a core into the plastic melt. Via the core, gas under pressure in then fed into the plastic melt and also released again. The opening for the gas is significantly larger in the case of a hydraulic injector than in the case of an annular-gap injector. A reproducible pressure build-up and a faster pressure relief with low pressure loss are advantageous. A self-cleaning effect is also achieved. It is disadvantageous that the plastic melt can enter the comparatively large opening of the hydraulic injector, that is to say over-injecting occurs. Moreover, there are high investment costs, the operation is complicated and there is a high cleaning cost.

Starting from the explained prior art, the invention is based on the object of providing a molding tool of the type referred to in the introduction, with which a defined pressure build-up and a fast pressure relief, with at the same time a low risk of over-injecting and low cleaning cost, are achieved.

The invention achieves the object by means of the subject of claim 1. Advantageous embodiments are to be found in the dependent claims, in the description and in the figures.

The invention achieves the object by means of a molding tool for producing a component in a gas-assisted injection molding process, comprising a mold cavity, the inner walls of which reproduce the contour of the component which is to be produced, a molding device, with which plastic melt can be introduced into the mold cavity, and an injection device with a pressure gas source, with which gas under pressure can be fed into the plastic melt which is introduced into the mold cavity, wherein the plastic melt is pressed against the inner walls of the mold cavity, wherein the injection device comprises a piston with an injector head, wherein the piston is moveably guided between an idle position and an operating position in a passage of the molding tool which is connected to the mold cavity, wherein the injector head forms a part of the inner walls of the mold cavity in the idle position, and wherein the injector head is pressed into the plastic melt contained in the mold cavity in the course of the movement of the piston into its operating position, so that the gas under pressure can flow through the passage into the plastic melt contained in the mold cavity, wherein the piston is moveable from the idle position into its operating position, driven by the gas which is to be fed through the passage into the plastic melt.

The molding tool according to the invention has a known per se molding device, with which plasticated plastic melt under pressure is injected into the mold cavity of the molding tool. Then, by means of the injection device gas under high pressure, e.g. at over 300 bar, is injected into the plastic melt, wherein forming of a gas bubble in the plastic melt and pressing of the plastic melt against the walls of the mold cavity take place. For this, the injection device comprises a pressure gas source which provides the gas under high pressure. The gas which is made available by the pressure gas source can be nitrogen ($N_2$), for example.

According to the invention, the injection device comprises a piston with an injector head, wherein the piston is moveable in a passage of the molding tool, specifically between an idle position and an operating position. In the idle position, the injector head forms a part of the inner walls of the mold cavity. In this case, the injector head can especially terminate flush with the surrounding wall of the mold cavity. In the idle position, the injector head closes off the passage against entry of plastic melt. Only if the piston has been moved into its operating position, in which the injector head is located in the plastic melt, is the opening to the passage freed. If the piston is moved from its idle position into its operating position, the injector head is pushed into the plastic melt which is contained in the mold cavity. According to the invention, the movement of the piston from its idle position into its operating position is carried out by means of the gas under high pressure which is provided by the pressure gas source and is to be fed into the plastic melt for the gas-assisted injection molding process. With the piston in its operating position, this gas can flow through the passage which accommodates the piston into the plastic melt which is contained in the mold cavity. The injection device according to the invention, especially the piston with the injector head, therefore forms a gas-driven plunger injector. This plunger injector opens by means of directed impingement upon the piston by the gas and in the process plunges into the plastic core of the plastic melt which forms the component which is to be produced. As a result, a reproducible gas process from cycle to cycle is made possible. The piston of the injection device according to the invention in this case only moves from its idle position into its operating position if a sufficient gas pressure is applied via the pressure gas source. As a result of this, the possibility of plastic melt entering the passage and therefore the possibility of the opening of the passage being closed off in the operating position of the piston in which the injector head is located inside the plastic melt, is reliably prevented. Over-injecting is therefore reliably excluded. As a result of this, it is possible in turn to select a comparatively large opening for the feed of the gas into the plastic melt. This in turn enables a defined pressure build-up and a fast pressure relief after terminating the injection molding process. This in turn reduces the necessary cycle time, and increased component outputs can be achieved. After terminating the gas-assisted injection molding process, the piston is moved back into its idle position and a new cycle can begin. As a result of this, a self-cleaning effect is ensured. The maintenance cost, which is especially associated with a cleaning process, is reduced.

The invention combines the advantages of the conventional injection devices which are explained above for the prior art without, however, reproducing the respective disadvantages. Therefore, as a result of the plunging or punching of the injector head into the already cooling plastic melt, a reproducible opening for the feed of the gas is carried out. When the gas is being introduced, a low pressure loss and a high gas throughput take place. As a result of this, high process reliability, specifically an increase in quality, and increased process stability, specifically a minimization of rejects, are achieved. The needle-like injector movement leads to self-cleaning and reduces the closing off of the injector head by plastic melt. The result is lower maintenance and increased efficiency. With the molding tool open, a quick and simple cleaning and also assembly are possible, as a result of which the machine efficiency is increased. The molding tool, especially the injector head according to the invention, is subjected to low wear and long maintenance cycles, as a result of which the tool repair costs can be lowered. Over-injecting is largely avoided since the injection device only opens by the gas pressure which is applied. A simple machine operation follows. Furthermore, there is no requirement for additional machine accessories, such as devices for a hydraulic injector like hydraulic core pulls, cylinders, limit switches, etc. The investment costs are reduced, as well as the maintenance costs.

According to a particularly practical embodiment, the piston may comprise a piston rod which carries the injector head. The passage can then furthermore comprise a first section which accommodates the piston and a second section which accommodates the piston rod, wherein the cross section of the second section is smaller than the cross section of the first section. In particular, the piston can be moveable in the first section between two stop surfaces. The stop surfaces define end positions of the piston, especially its idle position and its operating position. The piston can especially butt against the respective stop surface with sealing effect in this case for a throughflow of gas. In these embodiments, the injector head is arranged on the end of the piston rod facing away from the piston. The piston, the piston rod and the injector head can be designed in one piece of in a multiple of pieces. In this case, the cross section of the second section of the passage is smaller than the cross section of the piston. Naturally, the cross section of the piston rod is also smaller than the cross section of the second section which accommodates the piston rod. Correspondingly, the cross section of the piston is naturally smaller than the cross section of the first section which accommodates the piston. The piston and the piston rod can be of circular cylindrical design in each case. Correspondingly, the first and second sections of the passage can have a circular cylindrical cross section. In this case, the diameter of the second section is then smaller than the diameter of the first section.

Between the piston rod and the inner wall of the second section of the passage, a gap can be formed, with a gap width of at least 0.5 mm, especially of at least 1.0 mm or more than 1.0 mm. In this case, it can especially be an annular gap. Through this gap, the gas under high pressure for the gas-assisted injection molding process makes its way into the plastic melt. The gap width in this case can also be more than 2 mm, especially more than 3 mm. As explained in the introduction, on account of the piston which is actuated according to the invention by means of the gas for the gas-assisted process, large openings, especially gap widths, are also possible without the occurrence of over-injecting. Correspondingly, between the piston and the inner wall of the first section of the passage a gap is formed, for example also with a gap width of at least 0.5 mm, especially of at least 1.0 mm or more than 1.0 mm. The gas then also passes through this gap.

According to a further embodiment, provision can be made for a gas feeding line which connects the pressure gas source and the first section of the passage. In this case, it is possible, for example, that the gas feeding line connects the pressure gas source to the first section via a third section of the passage which is arranged between the gas feeding line, which is connected to the pressure gas source, and the first section, wherein the third section for example can have a smaller cross section than the first section. Via the gas feeding line, the gas under high pressure which is provided by the pressure gas source for the gas-assisted injection molding process is directed into the first section of the passage and further to the mold cavity which contains the plastic melt. According to a further embodiment, provision can be made for a gas discharge line which is connected to the first section of the passage and through which gas can discharge at the end of the gas-assisted injection molding process when the piston moves back into its idle position. The gas discharge line can in turn be connected to the first section, for example via a third section of the passage, as described above. Via the gas discharge line, the pressure reduction or the pressure relief is therefore carried out after the gas-assisted injection molding process has ended.

According to a further embodiment, it can be provided that provision is made for a further pressure gas source and also for a return line which connects the further pressure gas source to the first section of the passage, wherein gas under pressure can be guided through the return line into the first section of the passage by the further pressure gas source, which gas acts on the piston in order to move this from its operating position back into its idle position. The further pressure gas source which is provided in the case of this embodiment is connected via a return line to the first section of the passage, especially in the region of a stop surface of the first section against which the piston butts in its operating position. By means of the gas under pressure which is provided by further pressure gas source, via the return line an impulse can be exerted upon the piston in its operating position, which impulse moves this piston from its operating position back into its idle position.

For particularly simple control of the pressure gas flows, a non-return valve can be arranged in the gas feeding line, which non-return valve opens in a direction from the pressure gas source to the first section of the passage and closes in the opposite direction. Correspondingly, a non-return valve can be arranged in the return line, which non-return valve opens in a direction from the further pressure gas source to the first section of the passage and closes in the opposite direction.

According to a further embodiment, it can be provided that a control valve is arranged in the gas discharge line, wherein the pressure in the gas feeding line acts on a first side of the control valve in such a way that when gas is fed from the pressure gas source of the injection device the control valve closes the gas discharge line for a discharge of gas, and wherein the pressure in the gas discharge line acts on a second side of the control valve in such a way that when the piston is moved from its operating position into its idle position the control valve opens the gas discharge line for a discharge of gas. The control valve in this case is designed so that when gas is fed from the pressure gas source of the injection device for the gas-assisted injection molding process the pressure which acts at the connection point of the gas discharge line to the passage is not sufficient to switch the control valve for the opening of the gas discharge line. The pressure from the pressure gas source has to first of all reduce for this. Only then is the pressure in the opposite direction, possibly supported by the further pressure gas source, high enough to open the control valve for a discharge of gas via the gas discharge line.

An exemplary embodiment of the invention is explained in more detail below with reference to figures. In the drawing:

BRIEF DESCRIPTION OF SOME EMBODIMENTS

Figure 1:
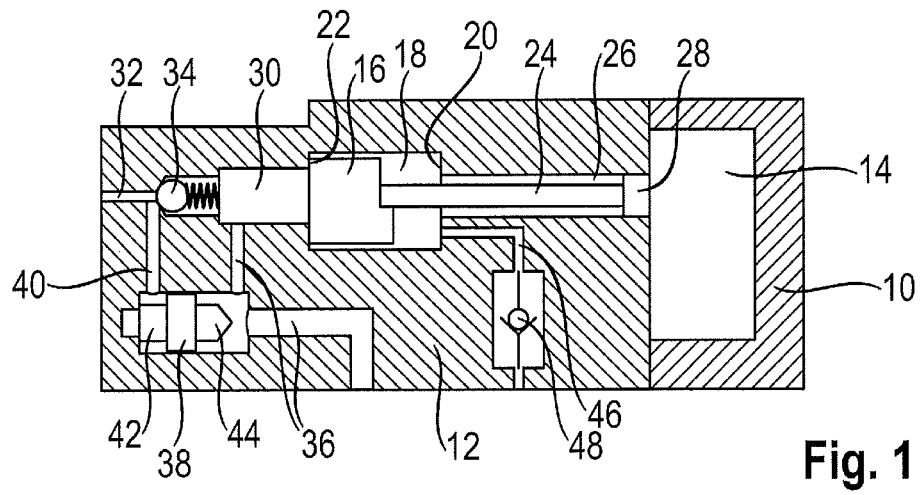
FIG. 1 schematically shows a molding tool according to the invention in a sectional view in a first operating state, FIG. 2 schematically shows the molding tool from FIG. 1 in a second operating state, and FIG. 3 schematically shows the molding tool from FIG. 1 in a third operating state.

Unless stated otherwise, the same designations refer to the same subjects in the figures. The molding tool according to the invention which is schematically shown in the figures has a first mold half 10 and a second mold half 12 in the depicted example. The first mold half 10 and the second mold half 12 are movable in relation to each other, in a way not shown, and between them form a mold cavity, designated 14 in FIG. 1, the inner walls of which reproduce the contour of a component which is to be produced with the molding tool according to the invention in a gas-assisted injection molding process. By means of an as known per se molding tool, which is not shown in the figures, plastic melt can be injected into mold cavity 14.

The molding tool according to the invention furthermore comprises an injection device with a pressure gas source, which is not shown in the figures. The injection device, in the depicted example, comprises a cylindrical piston 16 which in a first section 18—having a circular cross section—of a passage formed in the second mold half 12 is movable along its longitudinal direction, that is to say from left to right and vice versa in FIG. 1. In particular, the piston 16 is longitudinally movable between a first stop surface 20 and a second stop surface 22. The annular stop surfaces 20, 22 in the depicted example are arranged in the region of the ends of the first section 18 of the passage. Connected to the piston 16 is an also cylindrical piston rod 24 in the depicted example, which in said depicted example in a second section 26—also with circular cross section—of the passage formed in the second mold half 12 is movable along its longitudinal direction together with the piston 16. On its end facing away from the piston 16, the piston rod 24 carries an injector head 28 which in the depicted example has a circular cylindrical shape. In the operating state shown in FIG. 1, the injector head 28 forms a part of the inner walls of the mold cavity 14. In particular, the injector head 28 terminates flush with the surrounding inner wall of the mold cavity 14 and closes off the passage, especially the second section 26 of said passage, in relation to the mold cavity 14.

On the side facing away from the second section 26, a third section 30 of the passage which is formed in the second mold half 12 adjoins the first section 18. It is to be seen that the first section 18 has a larger cross section—a larger diameter in the present case—than the second section 26. It is also to be seen that the first section 18 also has a larger cross section—a larger diameter in the present case—than the third section 30 which in turn has a larger cross section—a larger diameter in the present case—than the second section 26. Between the piston rod 24 and the inner wall of the second section 26 of the passage an annular gap is formed in the present case, with a gap width of at least 0.5 mm, especially of 1.0 mm or more than 1.0 mm. An annular gap is also formed between the piston 16 and the inner wall of the first section 18 and for example can also have a gap width of at least 0.5 mm.

The pressure gas source—which is not shown—of the injection device is connected to the third section 30 and therefore also to the first section 18 and the second section 26 of the passage via a gas feeding 32 in which a non-return valve 34 is arranged. The non-return valve 34 opens in a direction from the pressure gas source to the first section 18 of the passage and closes in the opposite direction. Furthermore, provision is made for a gas discharge line 36 which is connected via the third section 30 to the first section 18 and therefore also to the second section 26 of the passage, in which gas discharge line 36 a control valve 38 is arranged. Via a control line 40, the pressure in the gas feeding line 32 acts on a first side 42 of the control valve 38. The pressure in the gas discharge line 36 acts on a second side 44 of the control valve 38.

In the region of the stop surface 20 for the piston 16 in its operating position, furthermore, a return line 46 opens into the first section 18 of the passage. The return line 46 is connected to a further pressure gas source, which is not shown, at its end facing away from the first section 18. Additionally arranged in the return line 46 is a non-return valve 48 which opens in a direction from the further pressure gas source to the first section 18 of the passage and closes in the opposite direction.

Figure 2:
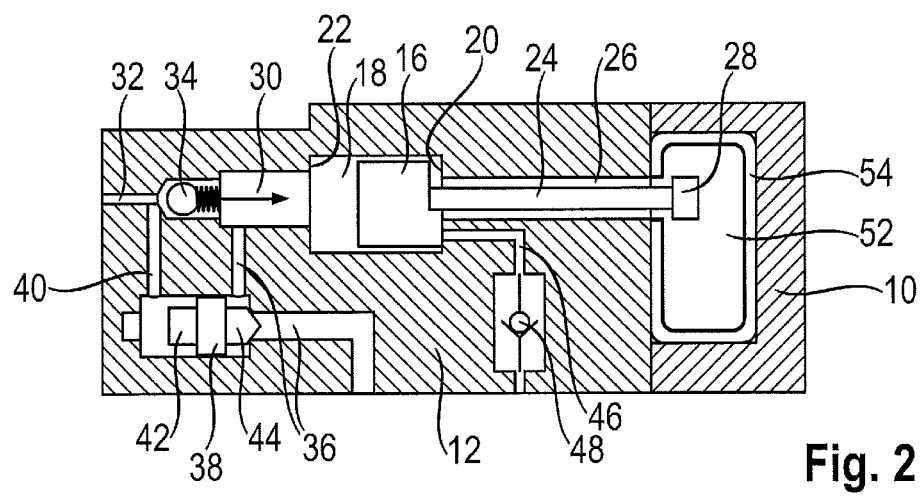

The molding tool according to the invention operates as follows: In the initial position shown in FIG. 1, in which the piston 16 is located in its idle position, plasticated plastic melt is injected into the mold cavity 14 by means of the injection device. Then, gas under high pressure which is provided by the pressure gas source of the injection device is directed, via the gas feeding line 32 and the non-return valve 34 which opens in this direction, through the third section 30 of the passage onto the end surface of the piston 16, which is on the left in FIG. 1. The piston 16 is pushed as a result of this inside the first section 18 from its idle position shown in FIG. 1 into its operating position shown in FIG. 2, as illustrated in FIG. 2 by means of the arrow 50. As a result of this movement of the piston 16, the piston rod 24 together with the injector head 28 are also moved in the longitudinal direction—from left to right in FIG. 1—so that the injector head 28 is plunged into the plastic melt which is contained in the mold cavity 14, as shown in FIG. 2.

In the process, the injector head 28 opens a passage to the mold cavity 14 so that the gas which is provided under high pressure by the pressure gas source can enter through the annular gap between the piston 16 and the inner wall of the first section 18 and through the annular gap between the piston rod 24 and the inner wall of the second section 26 into the plastic melt 54. In this case, the forming of a gas bubble—shown with the designation 52 in FIG. 2—inside the plastic melt 54 and the pressing of the plastic melt 54 against the inner walls of the mold cavity take place. As is to be seen in FIG. 2, the pressure acting on the first side 42 of the control valve 38 via the gas feeding line 32 and the control line 40 leads to this closing off the gas discharge line 36 so that a discharge of supplied gas via the gas discharge line 36 is prevented. At the same time, the non-return valve 48 also prevents a discharge of gas via the return line 46.

Figure 3:
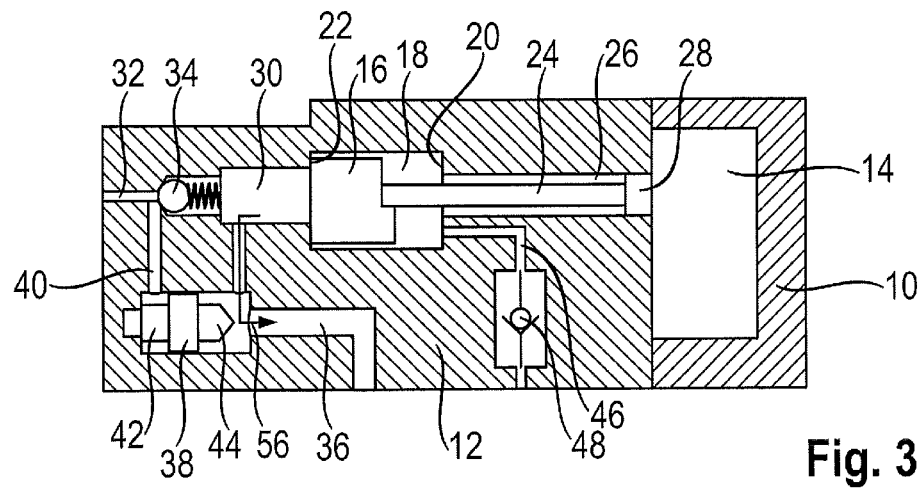

Before the opening of the molding tool, especially the opening for access to the mold cavity 14 with the plastic component located therein, a relief of pressure has to be carried out. To this end, no further pressure is generated by the pressure gas source on the one hand. On the other hand, via the further pressure gas source a pressure gas impulse is exerted on the end face of the piston 16, on the right in FIG. 2, via the non-return valve 48, which opens for this purpose, and the return line 46. As a result of this, the piston 16 is again pushed from its operating position shown in FIG. 2 into the idle position shown in FIG. 3. The pressure which now acts in the opposite direction to the arrow 50 shown in FIG. 2 leads to the control valve 38—in a manner actuated by a corresponding pressure in the gas discharge line 36 upon the second inlet of the control valve 38—being moved into the position shown in FIG. 3 in which it opens a passage through the gas discharge line 36. At the same time, the non-return valve 34 in the gas feeding line 32 closes, as also shown in FIG. 3. A discharge of gas via the gas discharge line is now possible, as illustrated in FIG. 3 by means of the arrow 56. As a result of this, an especially fast and reliable relief of pressure is ensured. The molding tool can then be opened by, for example, the first mold half 10 being detached from the second mold half 12 and by the produced component being able to be extracted from the mold cavity 14. After this, a new cycle can begin.

The invention claimed is:

1. Molding tool for producing a component in a gas-assisted injection molding process, comprising a mold cavity, whose inner walls form the contour of the component to be produced, a molding device, with which plastic melt can be introduced into the mold cavity and an injection device with a pressure gas source, with which gas under pressure can be fed into the plastic melt introduced into the mold cavity, whereby the plastic melt is pressed against the inner walls of the mold cavity, wherein the injection device comprises a piston with an injector head, wherein the piston is guided moveable between an idle position and a working position in a passage of the molding tool which is connected with the mold cavity, wherein the injector head forms a part of the inner walls of the mold cavity in the idle position, and wherein the injector head is pushed into the plastic melt contained in the mold cavity during movement of the piston into its operating position, so that gas under pressure can flow through the passage into the plastic melt contained in the mold cavity, wherein the piston is moveable from the idle position into its operating position driven by the gas to be fed through the passage into the plastic melt, wherein molding tool is configured to retract the piston to the idle position irrespective of the gas fed through the passage.

2. Molding tool as claimed in claim 1, wherein the piston comprises a piston rod carrying the injector head.

3. Molding tool as claimed in claim 2, wherein the passage comprises a first section accommodating the piston and a second section accommodating the piston rod, wherein the cross section of the second section is smaller than the cross section of the first section.

4. Molding tool as claimed in claim 3, wherein the piston is moveable in the first section between two stop surfaces.

5. Molding tool for producing a component in a gas-assisted injection molding process, comprising a mold cavity, whose inner walls form the contour of the component to be produced, a molding device, with which plastic melt can be introduced into the mold cavity and an injection device with a pressure gas source, with which gas under pressure can be fed into the plastic melt introduced into the mold cavity, whereby the plastic melt is pressed against the inner walls of the mold cavity, wherein the injection device comprises a piston with an injector head, wherein the piston is guided moveable between an idle position and a working position in a passage of the molding tool which is connected with the mold cavity, wherein the injector head forms a part of the inner walls of the mold cavity in the idle position, and wherein the injector head is pushed into the plastic melt contained in the mold cavity during movement of the piston into its operating position, so that gas under pressure can flow through the passage into the plastic melt contained in the mold cavity, wherein the piston is moveable from the idle position into its operating position driven by the gas to be fed through the passage into the plastic melt, wherein between the piston rod and the inner wall of the second section of the passage a gap is formed with a gap thickness of at least 0.5 mm.

6. Molding tool as claimed in claim 3, wherein between the piston and the inner wall of the first section of the passage a gap is formed with a gap thickness of at least 0.5 mm.

7. Molding tool as claimed in claim 3, wherein a gas feeding line is provided connecting the pressure gas source and the first section of the passage.

8. Molding tool for producing a component in a gas-assisted injection molding process, comprising a mold cavity, whose inner walls form the contour of the component to be produced, a molding device, with which plastic melt can be introduced into the mold cavity and an injection device with a pressure gas source, with which gas under pressure can be fed into the plastic melt introduced into the mold cavity, whereby the plastic melt is pressed against the inner walls of the mold cavity, wherein the injection device comprises a piston with an injector head, wherein the piston is guided moveable between an idle position and a working position in a passage of the molding tool which is connected with the mold cavity, wherein the injector head forms a part of the inner walls of the mold cavity in the idle position, and wherein the injector head is pushed into the plastic melt contained in the mold cavity during movement of the piston into its operating position, so that gas under pressure can flow through the passage into the plastic melt contained in the mold cavity, wherein the piston is moveable from the idle position into its operating position driven by the gas to be fed through the passage into the plastic melt, wherein a gas discharge line is provided connected with the first section of the passage, through which gas discharge line gas can be discharged after the end of the gas-assisted injection molding process, when the piston moves back into its idle position.

9. Molding tool as claimed in claim 8, wherein a further pressure gas source and a return line connecting the further pressure gas source with the first section of the passage is provided, wherein gas under pressure can be guided through the return line into the first section of the passage by the further pressure gas source, which gas acts on the piston so to move the piston from its operating position back into its idle position.

10. Molding tool as claimed in claim 7, wherein a non-return valve is provided in the gas feeding line, which non-return valve opens in a direction from the pressure gas source to the first section of the passage and closes in the opposite direction.

11. Molding tool as claimed in claim 9, wherein a non-return valve is provided in the return line, which opens in a direction from the further pressure gas source to the first section of the passage and closes in the opposite direction.

12. Molding tool as claimed in claim 8, wherein a control valve is provided in the gas discharge line, wherein the pressure in the gas feeding line acts on a first side of the control valve such that when gas is provided from the pressure gas source of the injection device the control valve closes the gas discharge line for a discharge of gas, and wherein the pressure in the gas discharge line acts on a second side of the control valve such that upon movement of the piston from its operating position into its idle position the control valve opens the gas discharge line for a discharge of gas.

13. Molding tool as claimed in claim 5, wherein between the piston rod and the inner wall of the second section of the passage a gap is formed with a gap thickness of at least 1.0 mm.

14. Molding tool as claimed in claim 6, wherein between the piston and the inner wall of the first section of the passage a gap is formed with a gap thickness of at least 1.0 mm.

15. Molding tool as claimed in claim 13, wherein between the piston rod and the inner wall of the second section of the passage a gap is formed, in formed with a gap thickness more than 1.0 mm.

16. Molding tool as claimed in claim 14, wherein between the piston and the inner wall of the first section of the passage a gap is formed, in formed with a gap thickness more than 1.0 mm.

17. Molding tool as claimed in claim 7, wherein a gas discharge line is provided connected with the first section of the passage, through which gas discharge line gas can be discharged after the end of the gas-assisted injection molding process, when the piston moves back into its idle position.

18. Molding tool as claimed in claim 1, wherein a gas discharge line independent of any gas supply line is provided connected with the first section of the passage, through which gas discharge line gas can be discharged after the end of the gas-assisted injection molding process, when the piston moves back into its idle position.

* * * * *